United States Patent
Wagle et al.

(10) Patent No.: US 11,753,574 B2
(45) Date of Patent: Sep. 12, 2023

(54) PACKER FLUID WITH NANOSILICA DISPERSION AND SODIUM BICARBONATE FOR THERMAL INSULATION

(71) Applicant: SAUDI ARABIAN OIL COMPANY, Dhahran (SA)

(72) Inventors: Vikrant Wagle, Dhahran (SA); Rajendra Kalgaonkar, Dhahran (SA); Abdullah S. Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 80 days.

(21) Appl. No.: 17/390,075

(22) Filed: Jul. 30, 2021

(65) Prior Publication Data
US 2023/0035211 A1 Feb. 2, 2023

(51) Int. Cl.
*C09K 8/504* (2006.01)
*C09K 8/508* (2006.01)
*E21B 33/138* (2006.01)
*C09K 8/516* (2006.01)

(52) U.S. Cl.
CPC ........... *C09K 8/5045* (2013.01); *C09K 8/508* (2013.01); *C09K 8/516* (2013.01); *E21B 33/138* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,557,876 A | 1/1971 | Tragesser | |
| 4,732,213 A * | 3/1988 | Bennett | C09K 8/50 166/275 |
| 4,901,797 A | 2/1990 | Summers et al. | |
| 5,320,171 A | 6/1994 | Laramay | |
| 5,398,758 A | 3/1995 | Onan et al. | |
| 7,013,973 B2 | 3/2006 | Danican et al. | |
| 7,458,424 B2 | 12/2008 | Odeh et al. | |
| 7,934,557 B2 | 5/2011 | Nguyen | |
| 7,954,549 B2 | 6/2011 | Lende et al. | |
| 8,741,818 B2 | 6/2014 | Ravi et al. | |
| 9,045,965 B2 | 6/2015 | Patil et al. | |
| 9,133,386 B2 | 9/2015 | Kumar et al. | |

(Continued)

FOREIGN PATENT DOCUMENTS

CN 111154470 A 5/2020

OTHER PUBLICATIONS

Wagle et al.; "Nanoparticle-based chemical treatment for preventing loss circulation", SPE-192309-MS, Society of Petroleum Engineers Inc., Apr. 2018 (10 pages).

(Continued)

*Primary Examiner* — Anuradha Ahuja
(74) *Attorney, Agent, or Firm* — Osha Bergman Watanabe & Burton LLP

(57) ABSTRACT

A downhole system includes a packer sealing an annular space around a downhole tubing and an insulating packer fluid positioned within the annular space and adjacent to the packer. The insulating packer fluid includes a sodium bicarbonate activator and an acidic nanosilica dispersion having silica nanoparticles and a stabilizer, wherein the pH of the acidic nanosilica dispersion ranges from 2 to 5, and the silica nanoparticles form at least 20 percent by weight of the acidic nanosilica dispersion.

19 Claims, 3 Drawing Sheets

(56) References Cited

U.S. PATENT DOCUMENTS

| | | |
|---|---|---|
| 10,053,613 B1 | 8/2018 | Kalgaonkar et al. |
| 10,113,406 B1 | 10/2018 | Gomaa et al. |
| 10,151,420 B2 | 12/2018 | Kalgaonkar et al. |
| 10,266,748 B2 | 4/2019 | Kalgaonkar et al. |
| 10,316,238 B2 | 6/2019 | Wagle et al. |
| 10,351,755 B2 | 7/2019 | Wagle et al. |
| 10,407,609 B2 | 9/2019 | Kalgaonkar et al. |
| 10,570,699 B2 | 2/2020 | Wagle et al. |
| 10,683,452 B2 | 6/2020 | Wagle et al. |
| 10,759,986 B2 | 9/2020 | Wagle et al. |
| 2011/0094746 A1 | 4/2011 | Allison et al. |
| 2015/0322328 A1 | 11/2015 | Boul et al. |
| 2016/0280982 A1 | 9/2016 | Boul et al. |
| 2017/0137694 A1 | 5/2017 | van Oort et al. |
| 2017/0234104 A1 | 8/2017 | James |
| 2018/0223152 A1* | 8/2018 | Wagle ................... C09K 8/035 |
| 2018/0327649 A1 | 11/2018 | Kalgaonkar et al. |
| 2018/0362827 A1 | 12/2018 | Bataweel et al. |
| 2019/0145222 A1* | 5/2019 | Wagle ................... E21B 36/003 166/302 |
| 2019/0161668 A1 | 5/2019 | Wagle et al. |
| 2019/0352555 A1 | 11/2019 | Kalgaonkar et al. |
| 2019/0375977 A1 | 12/2019 | Kalgaonkar et al. |
| 2020/0270503 A1 | 8/2020 | Wagle et al. |
| 2020/0407620 A1 | 12/2020 | Wagle et al. |
| 2021/0062075 A1* | 3/2021 | Kalgaonkar ............. C09K 8/74 |
| 2021/0403798 A1 | 12/2021 | Kalgaonkar et al. |

OTHER PUBLICATIONS

Al-Yami et al., "New Developed Acid Soluble Cement and Sodium Silicate Gel to Cure Lost Circulation Zones", SPE-172020-MS, Society of Petroleum Engineers Inc., Nov. 2014 (10 pages).

Wagle et al., "Novel Loss Circulation Composition to Treat Moderate to Severe Losses", SPE-194653-MS, Society of Petroleum Engineers Inc., Apr. 2019 (12 pages).

Sögaard et al., "Silica sol as grouting material: a physio-chemical analysis", Nano Convergence; vol. 5; No. 6; Feb. 28, 2018; pp. 1-15 (15 pages).

Stenstrøm, H.; "Nano silica treated water based drilling fluid formulation and analysis in various polymers and salts systems", Master's Thesis; University of Stravanger; Dec. 21, 2015 (150 pages).

* cited by examiner

PACKER FLUID WITH NANOSILICA DISPERSION AND SODIUM BICARBONATE FOR THERMAL INSULATION

BACKGROUND

Insulating packer fluids are often used in subterranean operations to insulate a hydrocarbon-containing fluid from the surrounding environment. Insulating packer fluids may be positioned in a downhole annular area formed between a first inner tubing and a second outer tubing (e.g., casing) or the walls of a well bore. The insulating fluid acts to insulate hydrocarbon fluid that may be located within the first tubing from the environment surrounding the first tubing or the second tubing to enable optimum recovery of the hydrocarbon fluid.

For instance, as hydrocarbon fluids flow from a downhole reservoir, which may have relatively hot temperatures, toward a production rig, the surrounding environment gets relatively colder. Heat transfer from hydrocarbon fluids may occur as the hydrocarbon fluids move through the changing temperatures, which may cause problems such as the precipitation of heavier hydrocarbons, severe reductions in flow rate, and in some cases, casing collapse. Insulating packer fluid is thought to protect the hydrocarbon fluids flowing through the insulated first tubing from the environment so that it can efficiently flow therethrough.

Insulating packer fluids also may be used for similar applications involving pipelines for similar purposes, e.g., to protect a fluid located within the pipeline from the surrounding environmental conditions so that the fluid can efficiently flow through the pipeline. Insulating fluids can be used in other insulating applications as well wherein it is desirable to control heat transfer. These applications may or may not involve hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to downhole systems including a packer sealing an annular space around a downhole tubing and an insulating packer fluid positioned within the annular space and adjacent to the packer. The insulating packer fluid may include a sodium bicarbonate activator and an acidic nanosilica dispersion having silica nanoparticles and a stabilizer, wherein the pH of the acidic nanosilica dispersion ranges from 2 to 5, and wherein the silica nanoparticles form at least 20 percent by weight of the acidic nanosilica dispersion.

In another aspect, embodiments of the present disclosure relate to methods of insulating an annular space around a downhole tubing that includes pumping an acidic nanosilica dispersion and a sodium bicarbonate activator downhole to the annular space, mixing the acidic nanosilica dispersion and the sodium bicarbonate activator to provide an insulating packer fluid, and waiting a period of time for the insulating packer fluid to statically age and gel into an insulating packer gel.

In yet another aspect, embodiments disclosed herein relate to downhole systems that may include a packer sealing an annular space around a downhole tubing and an insulating packer gel positioned within the annular space and adjacent the packer, wherein the insulating packer gel includes a plurality of interconnected silica nanoparticles, a stabilizer, and sodium bicarbonate.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments of the present disclosure relate generally to compositions of and methods for using thermally insulating packer fluids. Thermally insulating packer fluids disclosed herein may be sent downhole to an area sealed with a packer, where the thermally insulating packer fluid may be gelled in situ, in the area proximate the packer.

As used herein, fluids may refer to slurries, liquids, gases, and/or mixtures thereof. The term "insulating packer fluid" refers to a fluid that can be placed in the annular region of a well between an inner tubing and an outer tubing (e.g., casing) or wellbore wall and sealed with at least one packer to insulate the inner tubing. A packer refers to a type of sealing element that may be run into a well with a relatively smaller initial outer diameter that then expands to seal an area of the well. In various examples, insulating packer fluid may provide insulation around an inner tubing, hydrostatic pressure in order to lower differential pressure across the sealing element, lower differential pressure on the wellbore and casing to prevent collapse, and protect metals and elastomers from corrosion.

According to embodiments of the present disclosure, an insulating packer fluid may be an aqueous based two-component system consisting entirely of a nanosilica dispersion and an sodium bicarbonate activator. In other embodiments, the insulating packer fluid may include the nanosilica dispersion, the sodium bicarbonate activator, and at least one additive. Two different types of nanosilica dispersion may be used, either an acidic nanosilica dispersion or an alkaline nanosilica dispersion.

Insulating packer fluid according to embodiments of the present disclosure may be sent to a downhole location to insulate a downhole tubing. The insulating packer fluid may be filled within an annular space formed around the downhole tubing in order to completely surround and insulate the downhole tubing.

Figure 1:
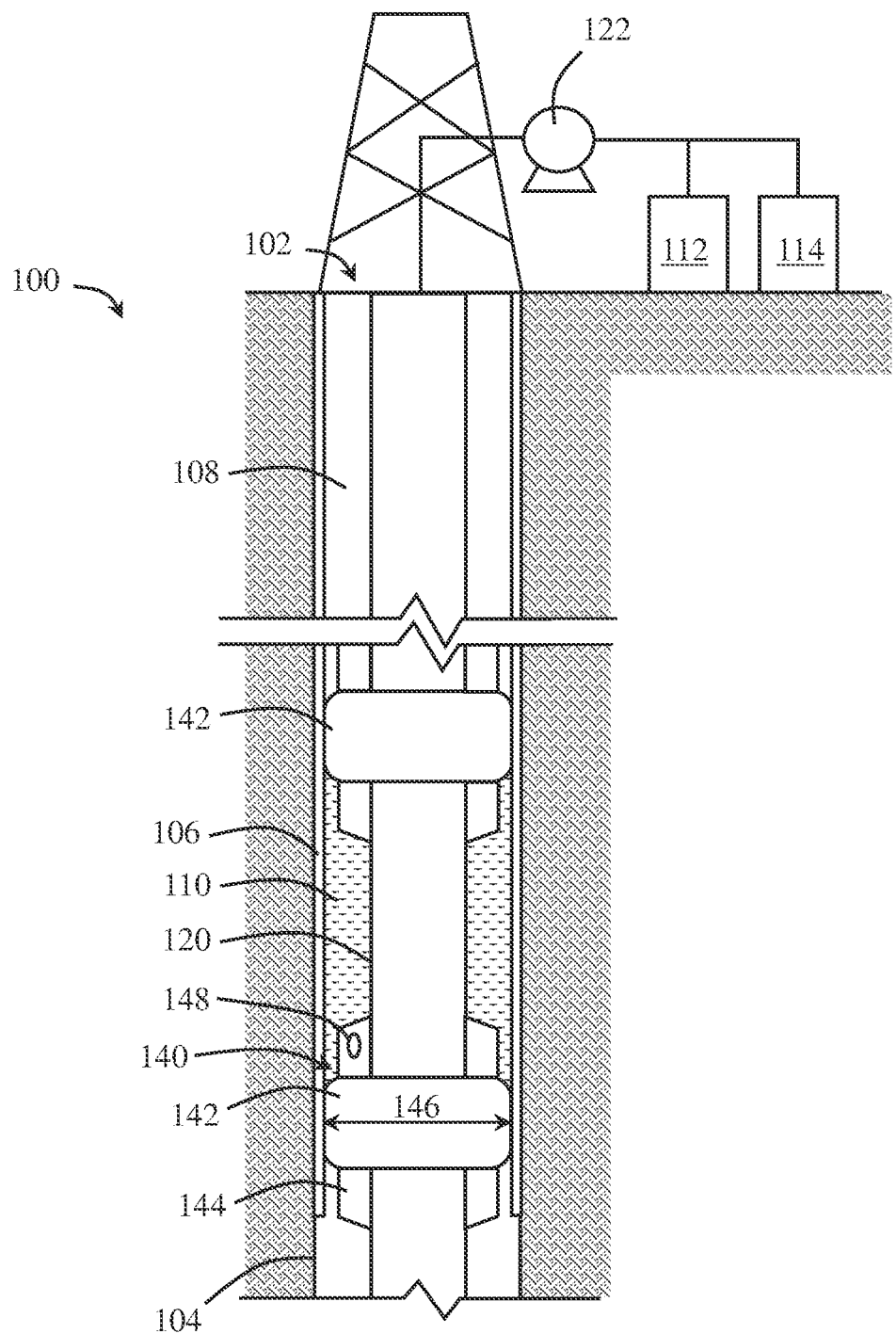
FIG. 1 shows a system according to embodiments of the present disclosure.

For example, FIG. 1 shows an example of a system 100 according to embodiments of the present disclosure using an insulating packer fluid 110 to insulate a downhole tubing 120. In the embodiment shown, the insulating packer fluid 110 is used to insulate a downhole tubing 120 that is production tubing extending through a well 102. However, in other embodiments, insulating packer fluid 110 may be used to insulate other types of downhole tubing. The downhole tubing 120 may extend through cased portions of the well 102 (where the wellbore wall 104 is lined with a casing 106) or open hole portions of the well 102 (where the wellbore wall 104 is exposed/unlined).

According to embodiments of the present disclosure, an annular space 108 around the downhole tubing 120 may be filled with the insulating packer fluid 110 to insulate the downhole tubing 120. For example, methods of insulating an annular space 108 around the downhole tubing 120 may include pumping (e.g., using one or more pumps 122) a nanosilica dispersion 112 and a sodium bicarbonate activator 114 downhole to the annular space 108 around the downhole tubing 120. The nanosilica dispersion 112 and the sodium bicarbonate activator 114 may be mixed in order to form the insulating packer fluid 110. After waiting a period of time for the insulating packer fluid 110 to statically age, the insulating packer fluid 110 may gel into an insulating packer gel.

Methods may include introducing the nanosilica dispersion 112 and the sodium bicarbonate activator 114 separately into the annular space 108. For example, the nanosilica dispersion may be pumped into the annular space 108 first, and then the sodium bicarbonate activator 114 may be pumped into the annular space after the nanosilica dispersion 112 has been pumped into the annular space 108. In such embodiments, the nanosilica dispersion 112 may be mixed with the sodium bicarbonate activator 114 under downhole conditions, e.g., a downhole pressure of at least 100 psi and a downhole temperature of at least 100° C. Embodiments herein may be useful over a wide range of downhole conditions, including temperatures of up to 200° C. (392° F.), for example.

In some embodiments, the nanosilica dispersion 112 and the sodium bicarbonate activator 114 may be mixed prior to pumping into the annular space 108. For example, the nanosilica dispersion and sodium bicarbonate may be mixed at the surface of the well, and then the formed insulating packer fluid may be pumped downhole to fill an annular space around the downhole tubing in an amount of time less than the time it takes for the insulating packer fluid to gel.

The sodium bicarbonate activator 114 may activate or initiate the gelling of silica nanoparticles in the nanosilica dispersion 112 by allowing bonding between multiple silica nanoparticles and formation of a silica nanoparticle network, or gel. Different bonds between silica nanoparticles may be formed to provide the insulating gel depending on surface modifications of the silica nanoparticles.

According to embodiments of the present disclosure, an annular space 108 to be filled with insulating packer fluid 110 may be at least partially sealed with at least one packer assembly 140. A packer assembly 140 may include at least one packer 142, which may be run into the well 102 with a smaller initial outside diameter that then radially expands externally to larger outside diameter 146 to seal a portion of the well 102. Examples of packer assemblies include production or test packers and inflatable packers. Production packers may be activated, or expanded, by squeezing the packer sealing element between two rigid structure, thereby forcing the sides of the packer to bulge outward. Inflatable packers may be activated, or expanded, by pumping a fluid into a bladder. Production packers are commonly set in cased portions of a well, and inflatable packers are commonly set in both open hole portions and cased portions of a well.

The packer assembly 140 may include at least one activation mechanism 144 used to radially expand the packer(s) 142 from a smaller initial diameter to a larger diameter 146 capable of sealing a portion of the well 102. When the annular space 108 is sealed by the packer assembly 140, the nanosilica dispersion 112 and sodium bicarbonate activator 114 may be pumped into the sealed area of the annular space 108 around the tubing 120. In some embodiments, the nanosilica dispersion 112 and the sodium bicarbonate activator 114 may be pumped through the packer assembly 140 into the annular space 108. For example, the packer assembly 140 may include at least one bypass line 148 fluidly connecting the interior flow path of the tubing 120 to the annular space 108 around the outside of the tubing 120. One or more valves within the bypass line 148 may controllably allow fluid flow through the packer assembly 140. In some embodiments, the nanosilica dispersion 112 and the sodium bicarbonate activator 114 may be pumped into the annular space 108 through one or more valved openings in the tubing 120.

In some embodiments, an insulating packer fluid (including the mixed nanosilica dispersion and sodium bicarbonate activator) may be provided in a single pill (e.g., a small amount of a specifically designed drilling fluid), which may then be pumped to the downhole location. For example, an insulating packer fluid pill may include a primary composition of acidic or alkaline nanosilica dispersion and sodium bicarbonate. When the insulating packer fluid pill is pumped to the downhole location (e.g., in an annular space around a downhole tubing), the insulating packer fluid may gel to form the insulating packer gel.

In some embodiments, insulating packer fluids may be pumped downhole as a one-component system, where both nanosilica and sodium bicarbonate may be mixed together, pumped downhole together, and allowed to set or gel. In some embodiments, insulating packer fluids may be pumped downhole as a two-component system, where both nanosilica and sodium bicarbonate may be pumped separately and allowed to mix and interact downhole, thereby resulting in gelling of the dispersion.

According to embodiments of the present disclosure, insulating packer gels formed of insulating packer fluids described herein may have a low thermal conductivity and may provide improved insulation around downhole tubings when compared with conventional insulation. Additionally, insulating packer fluids may be aqueous-based and may tolerate high temperatures (e.g., temperatures of 240° F. or above) for long periods of time, and thus able to be pumped downhole to form insulation around downhole tubing, Insulating packer fluids according to embodiments of the present disclosure may be used in applications requiring an insulating fluid such as pipeline and subterranean applications. The insulating packer fluids may utilize network structures formed from acidic or alkaline nanosilica dispersions and sodium bicarbonate activator to provide gelled packer fluid.

According to embodiments of the present disclosure, insulating packer fluids may be designed to have a selected gelling time (the time it takes for the insulating packer fluid to become fully gelled), where the nanosilica gelling can be controlled by varying the concentration of the activator. For example, an activator may be provided in a concentration to control nanosilica gelling to a gelling time of less than 10 hours and/or more than 2 hours. Gelling time may depend on, for example, the depth and temperature of the well, and may be designed to make sure the insulating packer fluid does not gel before it reaches the target depth. In some embodiments, an activator may be provided in a concentration ranging from about 1% vol/vol to about 40% vol/vol. Delayed and controlled gelling of the fluid may provide easier pumping capabilities and allow the insulating packer fluids to be sent to the desired downhole location prior to gelling.

Further, insulating packer fluids may be formulated at various densities by adding different weighting agents, such as barite, manganese tetroxide, which may help in positioning the insulating packer fluid in the desired downhole location.

According to embodiments of the present disclosure, the nanosilica dispersion may be either acidic or alkaline. Embodiments using an acidic nanosilica dispersion are described below separately from embodiments using an alkaline nanosilica dispersion.

Insulating Packer Fluid using Acidic Nanosilica Dispersion

According to embodiments of the present disclosure, an insulating packer fluid may consist entirely of an acidic nanosilica dispersion and a sodium bicarbonate activator, or an insulating packer fluid may include an acidic nanosilica dispersion, a sodium bicarbonate activator, and at least one additive. An acidic nanosilica dispersion may include silica nanoparticles, a stabilizer, and optionally a weak acid, where the silica nanoparticles form between about 5 and 50 percent by weight of the acidic nanosilica dispersion. In some embodiments, the silica nanoparticles may be amorphous silica forming at least 20 percent by weight of the acidic nanosilica dispersion.

In some embodiments, an acidic nanosilica dispersion may be prepared by modifying the silica nanoparticles with a cationic species. For example, an acidic suspension of silica nanoparticles may be cationic acidic colloidal silica, where the surfaces of the silica nanoparticles are modified with a cationic species. The cationic species may be either positive ions or cationic polymers. For example, cationic species may be positive ions with high valence. Ions that can be used include but are not limited to those of aluminum and iron, e.g., ions of aluminum ($Al_2O_3$) or aluminum sulfate ($Al_2(SO_4)^{3-}$) (alum), and ions of iron such as ferric chloride ($FeCl_3$) or ferric sulfate ($Fe_2(SO_4)^{3-}$). The cationic-modified nanosilica may be stabilized using an anionic counter ion as a stabilizer, such as chloride or oxy chloride.

Silica nanoparticles used in an acidic nanosilica dispersion may range in size, for example, from a lower limit of about 2 nm, 3 nm, 5 nm, or 10 nm to an upper limit of about 20 nm, 50 nm, 100 nm, or 150 nm in average diameter, where any lower limit may be used in combination with any upper limit. Additionally, silica nanoparticles may have a specific surface area ranging, for example, from a lower limit of about 20 m$^2$/g, 50 m$^2$/g, or 100 m$^2$/g to an upper limit of about 200 m$^2$/g, 500 m$^2$/g, 1,000 m$^2$/g, or 1,500 m$^2$/g, where any lower limit may be used in combination with any upper limit.

An acidic nanosilica dispersion may have a pH of less than 7 before interaction with a formation or space for placement. In some embodiments, the nanosilica dispersion has a pH in the range of about 2 to about 5 at 25° C. In some embodiments, the acidic nanosilica dispersion may have a pH ranging from about 3.5 and 4.

An acidic nanosilica dispersion may have a specific gravity of about 1.21 (g/ml). Further, an acidic nanosilica dispersion may have a viscosity of about or less than 30 cP at 25° C. The viscosity of the acidic nanosilica dispersion may allow for easy pumping and fluid flow.

According to embodiments of the present disclosure, a sodium bicarbonate activator may be mixed with the acidic nanosilica dispersion to form an insulating packer fluid. The sodium bicarbonate activator may be added to the acidic nanosilica dispersion after the acidic nanosilica dispersion is prepared (e.g., including surface modification to silica nanoparticles). A ratio of the sodium bicarbonate activator to the acidic nanosilica dispersion may range, for example, from 1:3 to 1:5 (e.g., a ratio of 1:4). The ratio of the sodium bicarbonate activator to the acidic nanosilica dispersion may be varied to provide increased or decreased gelling time of the insulating packer fluid.

In some embodiments, an acidic nanosilica dispersion for insulating packer fluid may include at least one additive. For example, in some embodiments, the acidic nanosilica dispersion may include calcium carbonate particles, fibers (such as polyester fibers, polypropylene fibers, starch fibers, polyketone fibers, ceramic fibers, glass fibers or nylon fibers), mica, graphite, or combinations thereof. In some embodiments, an acidic nanosilica dispersion may be formulated at various densities using different weighting agents, such as barite, manganese tetroxide. Additional materials for inclusion into the acidic nanosilica dispersion may be incorporated based on the desired heat transfer profile of the formed insulating packer gel (gelled solid which forms from the insulating packer fluid).

Upon mixing an acidic nanosilica dispersion and a sodium bicarbonate activator to form an insulating packer fluid, the insulating packer fluid may be allowed to gel. For example, the insulating packer fluid may be held in place for a period of time, where the insulating packer fluid is allowed to statically age. Gelation of the insulating packer fluid may be completed (e.g., where at least 95 percent of the insulating packer fluid has gelled) in at least 2 hours, at least 5 hours, or greater than 10 hours. The gelation time may depend, for example, on the temperature and pressure under which the insulating packer fluid is held and the ratio of sodium bicarbonate activator to the acidic nanosilica dispersion.

Insulating packer fluid made with an acidic nanosilica dispersion may be introduced into a space or annulus around a tubing (e.g., a production tubing) for insulation, such that the insulating packer fluid forms into a solid gelled material and alters the heat transfer profile around the tubing. Further, insulating packer fluid may be placed around the tubing and within a casing lining a well (i.e., in the annular space between the tubing and the casing), such that the acidic nanosilica dispersion may be blocked from contacting the formation around the wellbore wall by the casing.

Experiment 1

The thermal insulation property of insulating packer fluid according to embodiments of the present disclosure was evaluated by performing an experiment comparing the cooldown results for hot water using the insulating packer fluid and $CaCl_2$ brine. The experimental set-up included placing $CaCl_2$ brine in a first 400 ml glass beaker and insulating packer fluid according to embodiments of the present disclosure in a second 400 ml glass beaker. The insulating packer fluid used in the experiment consisted of an acidic nanosilica dispersion gelled using sodium bicarbonate as the activator. The insulating packer fluid was made by adding 20 g of sodium bicarbonate to 80 g of acidic nanosilica dispersion. The acidic nanosilica dispersion and sodium bicarbonate mixture was subjected to static aging at 250° F. for 16 hours at 100 psi pressure. After 16 hours of static aging, the acidic nanosilica dispersion was converted into a gelled solid. The acidic nanosilica (CS30-516 P) was obtained from Akzo Nobel (Netherlands) and was stabilized by oxy chloride. Table 1, below, shows properties of the acidic nanosilica dispersion.

TABLE 1

| Specific surface area ($m^2/g$) | Surface area ($m^2/g$, via BET)) | wt % $SiO_2$ | pH | Density (g/ml) | Viscosity (cps) |
|---|---|---|---|---|---|
| 160 | 200 | 25 | 3.8 | 1.2 | 3.0 |

Two measuring cylinders were each placed within the two 400 ml glass beakers, such that the $CaCl_2$ brine in the first beaker surrounded the first measuring cylinder, and the insulating packer fluid in the second beaker surrounded the second measuring cylinder. Testing water (150 ml) was heated to 110° F., after which 20 ml of the hot water was poured immediately into each of the two measuring cylinders. Two thermometers were then placed in each of the measuring cylinders and the cool-down rate was evaluated by measuring the time taken for the hot water placed in the measuring cylinders to reach 74.8° F.

Figure 2:
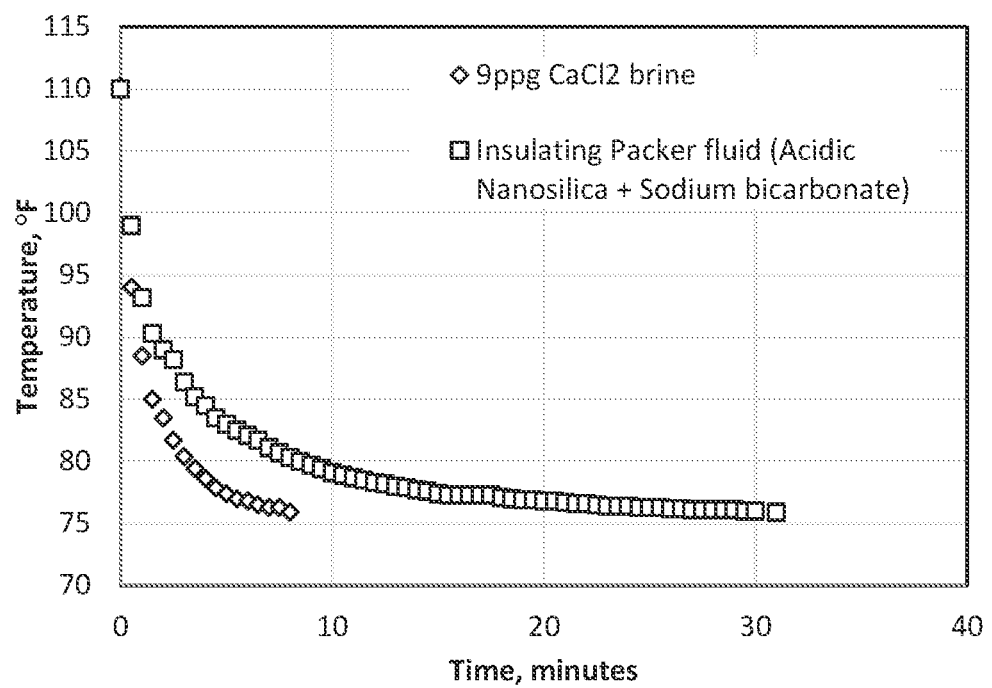
FIG. 2 shows a graph comparing the cooling rates of an insulating packer fluid according to embodiments of the present disclosure and a brine mixture.

FIG. 2 shows the results from Experiment 1. As shown, the time it took for the hot water to cool from 110° F. to 74.8° F. when insulated by the insulating packer fluid was 40 min, while the time it took for the hot water to cool from 110° F. to 74.8° F. when insulated by the $CaCl_2$ brine was 16.5 min. This time difference shows that the heat loss in the case of the acidic-based insulating packer fluid is much less than in the case of $CaCl_2$ brine.

According to embodiments of the present disclosure, an insulating packer fluid made with an acidic nanosilica dispersion may be pumped downhole to form an insulating packer gel positioned within an annular space between a downhole tubing and a casing lining the well wall in order to insulate the downhole tubing. Once allowed to gel, the insulating packer gel may include a plurality of interconnected silica nanoparticles, a stabilizer, and sodium bicarbonate. The silica nanoparticles may form at least 20 percent by weight of the insulating packer gel (e.g., greater than 25% wt, or greater than 40% wt). The pH of the insulating packer gel formed with an acidic nanosilica dispersion may be less than 7.

Insulating Packer Fluid using Alkaline Nanosilica Dispersion

According to embodiments of the present disclosure, an insulating packer fluid may consist entirely of an alkaline nanosilica dispersion and a sodium bicarbonate activator, or an insulating packer fluid may include an alkaline nanosilica dispersion, a sodium bicarbonate activator, and at least one additive. An alkaline nanosilica dispersion may include silica nanoparticles and a stabilizer, where the silica nanoparticles form between about 5 and 50 percent by weight of the alkaline nanosilica dispersion. In some embodiments, the silica nanoparticles may be amorphous silica forming at least 20 percent by weight of the alkaline nanosilica dispersion.

Alkaline silica nanoparticles may include nanoparticles formed from any type of alkaline silicate, including sodium silicate and potassium silicate, among others. In some embodiments, the alkaline nanosilica dispersion does not include sodium silicate.

Alkaline silica nanoparticles may have a size, for example, ranging from a lower limit of less than 1 nm, 1 nm, 5 nm, 10 nm, or 50 nm to an upper limit of about 50 nm, 100 nm, 500 nm, or 1,000 nm, where any lower limit may be used in combination with any upper limit. Additionally, alkaline silica nanoparticles may have a surface area ranging, for example, between 100 $m^2/g$ and 500 $m^2/g$. Without being bound to a particular theory, the surface area of the alkaline silica nanoparticles can affect the rate of gelation and the nature of the gels formed, where a smaller particle size of the alkaline silica nanoparticles in the alkaline nanosilica dispersion may promote faster gelling.

An alkaline nanosilica dispersion may be a silica nanoparticle composition having a pH between 9 and 11. In one or more embodiments, the alkaline nanosilica dispersion may have a pH between 9.5 and 10.5, when measured at room temperature.

The concentration of the alkaline silica nanoparticles in an alkaline nanosilica dispersion may range, for example, between 5 percent by weight (wt %) and 60 wt %. The concentration of nanosilica in the alkaline nanosilica dispersion may affect the rate of gelation, where the greater the concentration of nanosilica in the alkaline nanosilica dispersion the faster rate of gel formation.

A sodium bicarbonate activator may be mixed with an alkaline nanosilica dispersion to form an insulating packer fluid according to embodiments of the present disclosure. A sodium bicarbonate activator may be used at a weight ratio to the alkaline nanosilica dispersion in a range from about 1:1 to about 1:3. The ratio of the sodium bicarbonate activator to the alkaline nanosilica dispersion may vary, for example, depending on the desired gelation time. In some embodiments, the sodium bicarbonate activator may be present in an amount ranging from about 1 wt % to 40 wt % of the insulating packer fluid.

A sodium bicarbonate activator may decrease the pH of an alkaline nanosilica dispersion, causing the alkaline silica nanoparticles to aggregate, and thereby forming an insulating nanosilica gel. The rate and/or relative amount of sodium bicarbonate may impact the time for a solid gel to form within the well and insulate an area sealed by a packer.

Experiment 2

The thermal insulation property of insulating packer fluid according to embodiments of the present disclosure was evaluated by performing an experiment comparing the cool-down results for hot water using the insulating packer fluid and $CaCl_2$ brine. The experimental set-up included placing $CaCl_2$ brine in a first 400 ml glass beaker and insulating packer fluid according to embodiments of the present disclosure in a second 400 ml glass beaker. The insulating packer fluid used in the experiment consisted of an alkaline nanosilica dispersion gelled using sodium bicarbonate as the activator. The insulating packer fluid was made by adding 20 g of sodium bicarbonate to 80 g of alkaline nanosilica dispersion. The nanosilica dispersion and sodium bicarbonate mixture was subjected to static aging at 250° F. for 16 hours at 100 psi pressure. After 16 hours of static aging, the nanosilica dispersion was converted into a gelled solid. The alkaline nanosilica dispersion used included nanosilica (IDISIL SI 4545) obtained from Evonik Industries (Essen, Germany) and was stabilized by acetic acid. Table 2, below, shows properties of the alkaline nanosilica dispersion.

TABLE 2

| Particle size-Titrated (nm) | % SiO$_2$ | pH @ 25° C. | Specific gravity (g/ml) | Viscosity @ 25° C. (cps) | Visual appearance |
|---|---|---|---|---|---|
| 45 | 45 | 9-11 | 1.32 | | white/off-white |

Two measuring cylinders were each placed within the two 400 ml glass beakers, such that the CaCl$_2$ brine in the first beaker surrounded the first measuring cylinder, and the insulating packer fluid in the second beaker surrounded the second measuring cylinder. Testing water (150 ml) was heated to 110° F., after which 20 ml of the hot water was poured immediately into each of the two measuring cylinders. Two thermometers were then placed in each of the measuring cylinders and the cool-down rate was evaluated by measuring the time taken for the hot water placed in the measuring cylinders to reach 74.8° F.

Figure 3:
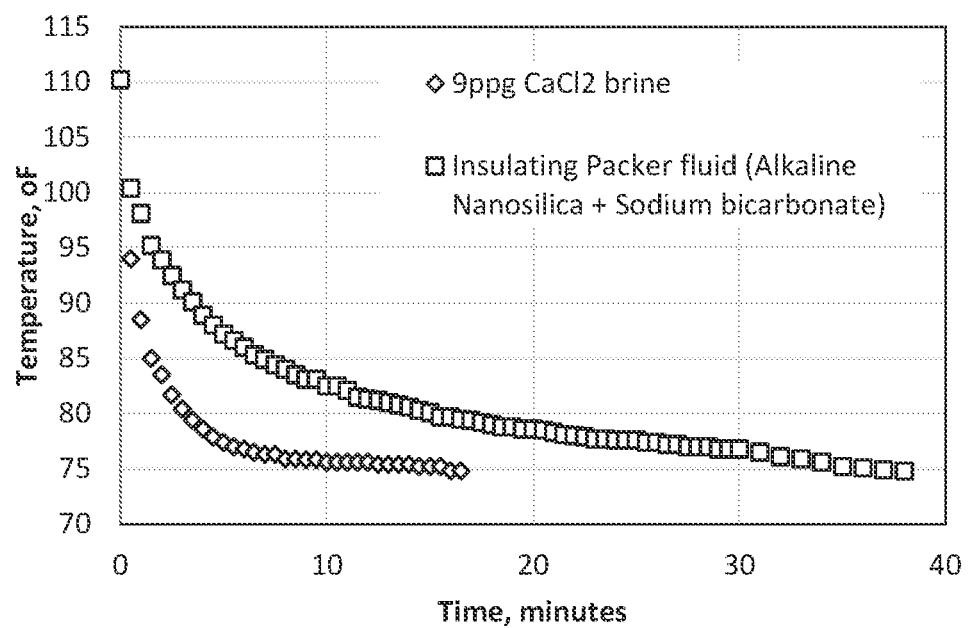
FIG. 3 shows a graph comparing the cooling rates of an insulating packer fluid according to embodiments of the present disclosure and a brine mixture.

FIG. 3 shows the results from Experiment 2. As shown, the time it took for the hot water to cool from 110° F. to 74.8° F. when insulated by the insulating packer fluid was 38 min, while the time it took for the hot water to cool from 110° F. to 74.8° F. when insulated by the CaCl$_2$ brine was 16.5 min. This time difference shows that the heat loss in the case of the alkaline-based insulating packer fluid is much less than in the case of CaCl$_2$ brine.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A downhole system, comprising:
   a packer sealing an annular space between a downhole inner tubing and an outer tubing; and
   an insulating packer fluid if (i) positioned within the annular space and adjacent the packer, and (ii) insulating the inner tubing, wherein the insulating packer fluid comprises:
      an acidic nanosilica dispersion, comprising:
         silica nanoparticles; and
         a stabilizer;
         wherein the pH of the acidic nanosilica dispersion ranges from 2 to 5; and
      a sodium bicarbonate activator.

2. The system of claim 1, wherein the acidic nanosilica dispersion has a pH ranging from 3.5 to 4.

3. The system of claim 1, wherein a ratio of the sodium bicarbonate activator to the acidic nanosilica dispersion ranges from 1:3 to 1:5.

4. The system of claim 1, wherein the acidic nanosilica dispersion is stabilized by the stabilizer, and wherein the stabilizer is oxy chloride.

5. The system of claim 1, wherein the silica nanoparticles are surface modified to have a cationic surface.

6. The system of claim 5, wherein the silica nanoparticles are surface modified using positive ions.

7. The system of claim 1, wherein the silica nanoparticles comprise at least one ion bonded to a surface of the silica nanoparticles, wherein the at least one ion is selected from ions of aluminum, aluminum sulfate, ferric chloride, and ferric sulfate.

8. The system of claim 1, wherein the silica nanoparticles form between 5 to 50 percent by weight of the acidic nanosilica dispersion.

9. A method of insulating an annular space around a downhole tubing comprising:
   pumping an acidic nanosilica dispersion and a sodium bicarbonate activator downhole to the annular space, wherein the acidic nanosilica dispersion comprises:
      silica nanoparticles modified with a cationic species; and a stabilizer,
   mixing the acidic nanosilica dispersion and the sodium bicarbonate activator to provide an insulating packer fluid;
   waiting a period of time for the insulating packer fluid to statically age and gel into an insulating packer gel; and
   leaving the insulating packer gel in the annular space to insulate the downhole tubing as a fluid is flowed through the downhole tubing.

10. The method of claim 9, wherein the acidic nanosilica dispersion and the sodium bicarbonate activator are introduced separately into the annular space.

11. The method of claim 10, wherein the sodium bicarbonate activator is pumped into the annular space after the acidic nanosilica dispersion has been pumped into the annular space.

12. The method of claim 9, wherein a ratio of the sodium bicarbonate activator to the acidic nanosilica dispersion that is pumped into the annular space ranges from 1:3 to 1:5.

13. The method of claim 9, wherein the acidic nanosilica dispersion is mixed with the sodium bicarbonate activator under downhole conditions.

14. The method of claim 9, wherein the annular space is sealed at one or both axial ends with at least one packer assembly.

15. The method of claim 14, wherein the acidic nanosilica dispersion and the sodium bicarbonate activator are pumped through a valved flowline into the annular space.

16. A downhole system, comprising:
   a packer sealing an annular space between a downhole inner tubing and an outer tubing; and
   an insulating packer gel (i) positioned within the annular space and adjacent the packer, and (ii) insulating the inner tubing, wherein the insulating packer gel comprises:
      a plurality of interconnected silica nanoparticles;
      a stabilizer; and
      sodium bicarbonate.

17. The system of claim 16, wherein the outer tubing is casing.

18. The system of claim 16, wherein the pH of the insulating packer gel is less than 7.

19. The system of claim 16, wherein the silica nanoparticles are modified with a cationic species.

* * * * *